(12) United States Patent
Park et al.

(10) Patent No.: US 9,159,968 B2
(45) Date of Patent: Oct. 13, 2015

(54) BATTERY PACK CASE

(75) Inventors: Jongho Park, Seoul (KR); Yongho Cho, Gyeonggi-do (KR); Joonyoung Shin, Incheon (KR)

(73) Assignee: LG Chem, Ltd. (KR)

(*) Notice: Subject to any disclaimer, the term of this patent is extended or adjusted under 35 U.S.C. 154(b) by 1298 days.

(21) Appl. No.: 12/309,991

(22) PCT Filed: Aug. 1, 2007

(86) PCT No.: PCT/KR2007/003690
§ 371 (c)(1),
(2), (4) Date: Sep. 17, 2009

(87) PCT Pub. No.: WO2008/018714
PCT Pub. Date: Feb. 14, 2008

(65) Prior Publication Data
US 2010/0047676 A1 Feb. 25, 2010

(30) Foreign Application Priority Data
Aug. 7, 2006 (KR) .................. 10-2006-0073995

(51) Int. Cl.
*H01M 2/00* (2006.01)
*H01M 2/02* (2006.01)
(Continued)

(52) U.S. Cl.
CPC ............ *H01M 2/105* (2013.01); *H01M 2/1077* (2013.01); *H01M 10/425* (2013.01); *H01M 10/48* (2013.01); *H01M 10/613* (2013.01);
(Continued)

(58) Field of Classification Search
None
See application file for complete search history.

(56) References Cited

U.S. PATENT DOCUMENTS

| 5,527,637 A | 6/1996 | Nakazawa et al. |
| 5,898,239 A | 4/1999 | Kawam |

(Continued)

FOREIGN PATENT DOCUMENTS

| JP | 09007564 A | 1/1997 |
| JP | 2000182538 A | 6/2000 |

(Continued)

OTHER PUBLICATIONS

English translation for JP 2005-100689.*
(Continued)

*Primary Examiner* — Yoshitoshi Takeuchi
(74) *Attorney, Agent, or Firm* — Lerner, David, Littenberg, Krumholz & Mentlik, LLP

(57) ABSTRACT

Disclosed herein are a pack case constructed in a structure in which a plurality of battery cells are mounted in the pack case to electrically connect the battery cells with each other, wherein the pack case includes an upper case and a lower case constructed in a hollow structure in which the upper case and the lower case are coupled with each other while the battery cells are mounted between the upper case and the lower case, each case is integrally provided at the inner part thereof with a plurality of spacers for supporting the battery cells, and each case is provided at the outer part thereof with a plurality of ventilation openings which communicate with the interior of each case, and a battery pack including the pack case. The pack case according to the present invention has effects in that a plurality of battery cells are stably mounted in the pack case in a compact structure through a simple assembly process, heat generated from the battery cells is effectively removed during the charge and discharge of the battery cells, and an additional safety unit, such as a detection member and/or a protection circuit module, is easily mounted to the pack case.

17 Claims, 5 Drawing Sheets

(51) Int. Cl.

| | |
|---|---|
| *H01M 2/28* | (2006.01) |
| *H01M 2/26* | (2006.01) |
| *H01M 2/24* | (2006.01) |
| *H01M 6/42* | (2006.01) |
| *H01M 10/38* | (2006.01) |
| *H01M 10/00* | (2006.01) |
| *H01M 6/00* | (2006.01) |
| *H01M 10/50* | (2006.01) |
| *H01M 2/10* | (2006.01) |
| *H01M 2/12* | (2006.01) |
| *H01M 10/42* | (2006.01) |
| *H01M 10/48* | (2006.01) |
| *H01M 10/625* | (2014.01) |
| *H01M 10/643* | (2014.01) |
| *H01M 10/6235* | (2014.01) |
| *H01M 10/613* | (2014.01) |
| *H01M 10/6562* | (2014.01) |
| *H01M 10/0525* | (2010.01) |

(52) U.S. Cl.
CPC ........ *H01M 10/625* (2013.01); *H01M 10/6235* (2013.01); *H01M 10/643* (2013.01); *H01M 10/6562* (2013.01); *H01M 10/0525* (2013.01); *Y02T 10/7011* (2013.01)

(56) References Cited

U.S. PATENT DOCUMENTS

| | | | |
|---|---|---|---|
| 6,097,173 A | 8/2000 | Bryant, Jr. | |
| 6,225,788 B1 | 5/2001 | Kouzu et al. | |
| 6,410,184 B1 | 6/2002 | Horiuchi et al. | |
| 6,428,925 B1 | 8/2002 | Takeno et al. | |
| 6,465,123 B1 * | 10/2002 | Baumann et al. | 429/99 |
| 6,541,154 B2 | 4/2003 | Oogami et al. | |
| 6,641,942 B1 | 11/2003 | Rouillard et al. | |
| 2001/0039150 A1 | 11/2001 | Saito et al. | |
| 2002/0025455 A1 | 2/2002 | Yoneyama | |
| 2003/0215702 A1 | 11/2003 | Tanjou et al. | |
| 2004/0043287 A1 | 3/2004 | Bando et al. | |
| 2004/0043663 A1 | 3/2004 | Ikeda et al. | |
| 2004/0125628 A1 * | 7/2004 | Yamada et al. | 363/177 |
| 2005/0287427 A1 | 12/2005 | Kim et al. | |
| 2006/0170394 A1 | 8/2006 | Ha et al. | |
| 2006/0177734 A1 | 8/2006 | Yao | |
| 2006/0194101 A1 | 8/2006 | Ha et al. | |
| 2010/0015519 A1 | 1/2010 | Trester et al. | |

FOREIGN PATENT DOCUMENTS

| | | | | |
|---|---|---|---|---|
| JP | 2000228178 A | | 8/2000 | |
| JP | 2001-155702 | * | 6/2001 | ............. H01M 2/10 |
| JP | 2003109674 A | | 4/2003 | |
| JP | 2003-242950 A | | 8/2003 | |
| JP | 2004152706 A | | 5/2004 | |
| JP | 2005-100689 | * | 4/2005 | ............. H01M 2/10 |
| JP | 2005183241 A | | 7/2005 | |
| JP | 2005-317457 A | | 11/2005 | |
| WO | 2008001874 A1 | | 1/2008 | |

OTHER PUBLICATIONS

English translation for JP 2001-155702.*
International Search Report, PCT/KR2007/004444.

* cited by examiner

BATTERY PACK CASE

CROSS REFERENCE TO RELATED APPLICATIONS

The present application is a national phase entry under 35 U.S.C. §371 of International Application No. PCT/KR2007/003690, filed Aug. 1, 2007, published in English, which claims the benefit of Korean Patent Application No. KR10-2006-0073995, filed Aug. 7, 2006. The disclosures of said applications are incorporated by reference herein.

TECHNICAL FIELD

The present invention relates to a battery pack case, and, more particularly, to a pack case constructed in a structure in which a plurality of battery cells are mounted in the pack case to electrically connect the battery cells with each other, wherein the pack case includes an upper case and a lower case constructed in a hollow structure in which the upper case and the lower case are coupled with each other while the battery cells are mounted between the upper case and the lower case, each case is integrally provided at the inner part thereof with a plurality of spacers for supporting the battery cells, and each case is provided at the outer part thereof with a plurality of ventilation openings which communicate with the interior of each case.

BACKGROUND ART

As mobile devices have been increasingly developed, and the demand of such mobile devices has increased, the demand of secondary batteries has also sharply increased as an energy source for the mobile devices. Among them is a lithium secondary battery having high energy density and high discharge voltage, on which much research has been carried out and which is now commercially available and widely used.

Depending upon the kinds of external devices in which the secondary batteries are used, the secondary batteries may be used in the form of a single battery or in the form of a battery pack having a plurality of unit cells electrically connected with each other. For example, small-sized devices, such as mobile phones, can be operated for a pre-determined period of time with the output and the capacity of one battery. On the other hand, a battery pack needs to be used in medium- or large-sized devices, such as laptop computers, power tools, and hybrid electric vehicles, because high output and large capacity are necessary for the medium- or large-sized devices.

The battery pack is a battery structure in which a plurality of unit cells are electrically connected in series and/or in parallel with each other. It is very important for the battery pack to maintain the stable arrangement structure of the unit cells such that the unit cells can be electrically connected with each other in sequence.

Especially, cylindrical secondary batteries, which are used as the unit cells of the battery pack, have great difficulty in maintaining the arrangement structure due to the appearance characteristics thereof. For this reason, the use of additional fixing members is necessary for the cylindrical secondary batteries.

Generally, a battery pack including such cylindrical secondary batteries is constructed such that spacers having a structure corresponding to the external shape of the cylindrical secondary batteries are disposed between the cylindrical secondary batteries so as to maintain the arrangement structure of the cylindrical secondary batteries. However, the spacers interfere with the flow of heat generated from the cylindrical secondary batteries during the charge and discharge of the cylindrical secondary batteries, thereby causing the degradation of the battery pack. Also, the spacers are mounted to the battery pack as separate members with the result that the assembly process is complicated, and the manufacturing costs are increased. In addition, the battery pack is constructed by mounting the cylindrical secondary batteries fixed to the spacers in an additional external case. However, the use of the spacers and the external case increases the volume and weight of the battery pack.

Especially, a battery pack used as a power source for portable power tools, such as electric drills, or hybrid electric vehicles greatly needs a unit for stably maintaining the arrangement structure of unit cells, even when external physical impacts, such as vibration or dropping, are applied to the battery pack, and smoothly moving a large amount of heat instantaneously generated from the battery pack due to a high rate of discharge from the battery pack.

DISCLOSURE OF INVENTION

Technical Problem

Therefore, the present invention has been made to solve the above problems, and other technical problems that have yet to be resolved.

Specifically, it is an object of the present invention to provide a pack case constructed such that a plurality of battery cells are stably mounted in the pack case in a compact structure through a simple assembly process.

It is another object of the present invention to provide a pack case that is capable of effectively removing heat generated from the battery cells during the charge and discharge of the battery cells.

It is another object of the present invention to provide a pack case constructed in a structure in which an additional safety unit, such as a detection member and/or a protection circuit module, is easily mounted to the pack case.

It is a further object of the present invention to provide a battery pack including such a pack case.

Technical Solution

In accordance with one aspect of the present invention, the above and other objects can be accomplished by the provision of a pack case constructed in a structure in which a plurality of battery cells are mounted in the pack case to electrically connect the battery cells with each other, wherein the pack case includes an upper case and a lower case constructed in a hollow structure in which the upper case and the lower case are coupled with each other while the battery cells are mounted between the upper case and the lower case, each case is integrally provided at the inner part thereof with a plurality of spacers for supporting the battery cells, and each case is provided at the outer part thereof with a plurality of ventilation openings which communicate with the interior of each case.

Consequently, the pack case according to the present invention has advantages in that a plurality of battery cells are stably mounted in the pack case in a compact structure through a simple assembly process, and heat generated from the battery cells is effectively removed during the charge and discharge of the battery cells, thereby improving the structural stability of the battery pack and the safety of the battery pack against fire.

The shape of the upper case and the lower case is not particularly restricted. Consequently, it is possible to manufacture the upper case and the lower case in various shapes. For example, the upper case and the lower case may be coupled with each other in a hexahedral structure such that the battery cells are stably stacked between the upper case and the lower case. Also, the upper case and the lower case may be manufactured in the same shape such that the upper case and the lower case are coupled with each other in a symmetrical structure. In this case, the upper case and the lower case may be coupled with each other without making a distinction between the upper case and the lower case during the assembly of the pack case, whereby high assembly efficiency is accomplished.

Also, the upper case and the lower case may be coupled with each other in various structures without limits. For example, the upper case and the lower case may be coupled with each other through the insertion of hooks into coupling grooves. In this case, the hooks and the coupling grooves may be formed at one side of the interface between the upper case and the lower case such that the hooks correspond to the coupling grooves.

When the upper case and the lower case are constructed in a symmetrical structure as described above, the hooks and the coupling grooves may be formed at the interface between the upper case and the lower case in a symmetrical fashion. Specifically, when the hooks are formed at the upper case at one side of the interface between the upper case and the lower case, and the coupling grooves are formed at the lower case at one side of the interface between the upper case and the lower case, the coupling grooves are formed at the upper case at the other side of the interface between the upper case and the lower case, and the hooks are formed at the lower case at the other side of the interface between the upper case and the lower case, whereby the hooks and the coupling grooves are arranged in a symmetrical structure.

In a preferred embodiment, the spacers protrude from the inner part of the pack case by a predetermined length such that the spacers partially surround the outer circumferences of neighboring battery cells. According to circumstances, the pack case may be provided in the outer part thereof corresponding to the spacers with a plurality of through-holes such that the spacers communicate with the outside of the pack case at the centers thereof. For example, when cylindrical secondary batteries are used as the unit cells of the battery pack, the spacers may be constructed in a structure to partially surround neighboring four cylindrical secondary batteries. Specifically, when the neighboring four cylindrical secondary batteries are brought into contact with each other, the spacers may be constructed in a hollow cylindrical structure formed by neighboring four arc parts clustered in an empty space created among the neighboring cylindrical secondary batteries due to the characteristics of a curved surface.

In a preferred embodiment, each case is provided in the outer part thereof corresponding to electrode terminals of the battery cells with connection through-holes through which electrode terminals of the battery cells are exposed, and each case is provided in the outer part thereof between the connection through-holes with protrusions for mounting a connection member to the pack case. In this case, the connection through-holes and the protrusions may be formed in various sizes and shapes without particular restriction.

In the above-described structure, the material for the connection member is not particularly restricted so long as the connection member connects the electrode terminals of the battery cells with each other. Preferably, the connection member is a metal plate.

According to circumstances, the upper case and/or the lower case may be provided with coupling members for mounting a protection circuit unit to the corresponding case. The structure of the coupling members is not particularly restricted so long as the coupling members stably mount the protection circuit unit to the corresponding case. For example, the coupling members may be constructed in a hook structure.

In accordance with another aspect of the present invention, there is provided a battery pack including the pack case with the above-stated construction. The battery pack may be used as a high rate discharge power source requiring the combination of a plurality of battery cells. The battery pack is not particularly restricted so long as cylindrical battery cells are mounted in the battery pack. Preferably, the battery pack is used as a power source for power tools or hybrid electric vehicles.

According to the present invention, electrode terminals of battery cells constituting the battery pack are exposed through connection through-holes formed in the outer parts of the upper and lower cases at positions corresponding to the electrode terminals of battery cells in the pack case, and the wherein electrode terminals of battery cells are electrically connected with each other by the connection member mounted to the outer part of the corresponding case.

In the above-described structure, a detection member for detecting the voltage of the battery cells may be further connected to the connection member. Preferably, the detection member is a printed circuit board (PCB) or a flexible printed circuit board (FPCB).

Also, a protection circuit unit may be further mounted to one side of the pack case. In this case, the protection circuit unit is preferably connected to the detection member.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF MAIN REFERENCE
NUMERALS OF THE DRAWINGS

100: pack case  101: uppercase
102: lower case  110: spacer
120: ventilation openings  200: battery cells
300: connection member  400: detection member
500: protection circuit module

MODE FOR THE INVENTION

Now, preferred embodiments of the present invention will be described in detail with reference to the accompanying drawings. It should be noted, however, that the scope of the present invention is not limited by the illustrated embodiments.

Figure 1:
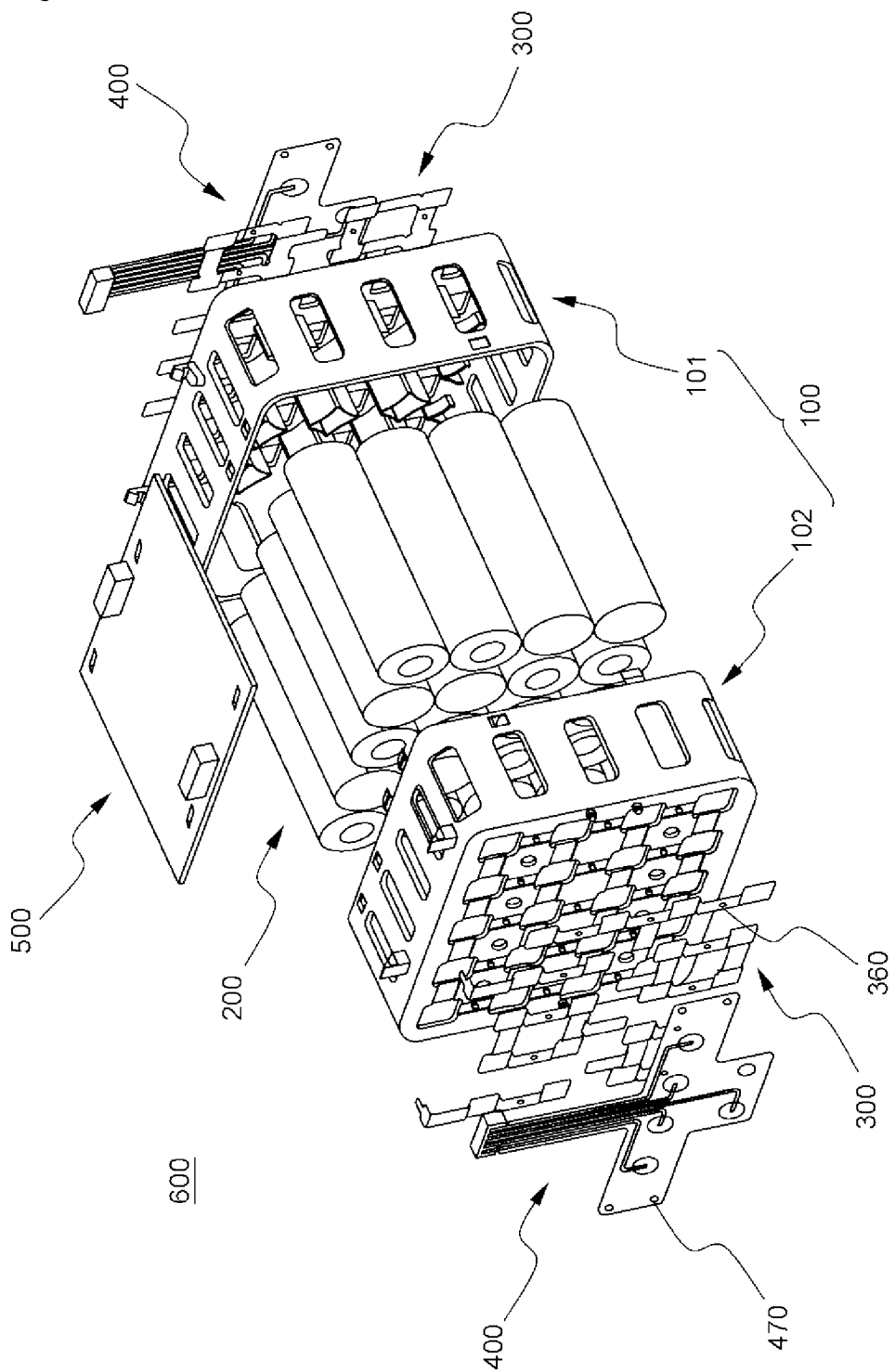
FIG. 1 is an exploded perspective view illustrating a battery pack including a battery pack case according to a preferred embodiment of the present invention.

FIG. 1 is an exploded perspective view typically illustrating a battery pack according to a preferred embodiment of the present invention.

Referring to FIG. 1, the battery pack 600 includes a battery pack case 100 constructed in a structure in which a plurality of cylindrical battery cells 200 are mounted in the battery pack case 100, a metal plate 300 for electrically connecting the battery cells 200 with each other, a flexible printed circuit board (FPCB) 400 connected to the metal plate 300 for detecting the voltage of the battery cells 200, and a protection circuit unit 500 connected to the FPCB 400 for controlling the battery cells 200.

The battery pack case 100 includes an upper case 101 and a lower case 102, which are coupled with each other in a symmetrical structure. Each of the upper and lower cases 101 and 102 is integrally provided at the inner part thereof with a plurality of spacers 110 for supporting the cylindrical battery cells 200. Each of the upper and lower cases 101 and 102 is provided at the outer part thereof with a plurality of ventilation openings 120 (see FIG. 2) which communicate with the interior of each of the upper and lower cases 101 and 102. The detailed structure of the pack case is shown in more detail in FIGS. 2 and 3. For convenience of description, a part of the pack case is illustrated in FIG. 2; however, the structure shown in FIG. 2 may be applied equally to both the upper case and the lower case.

Figure 2:
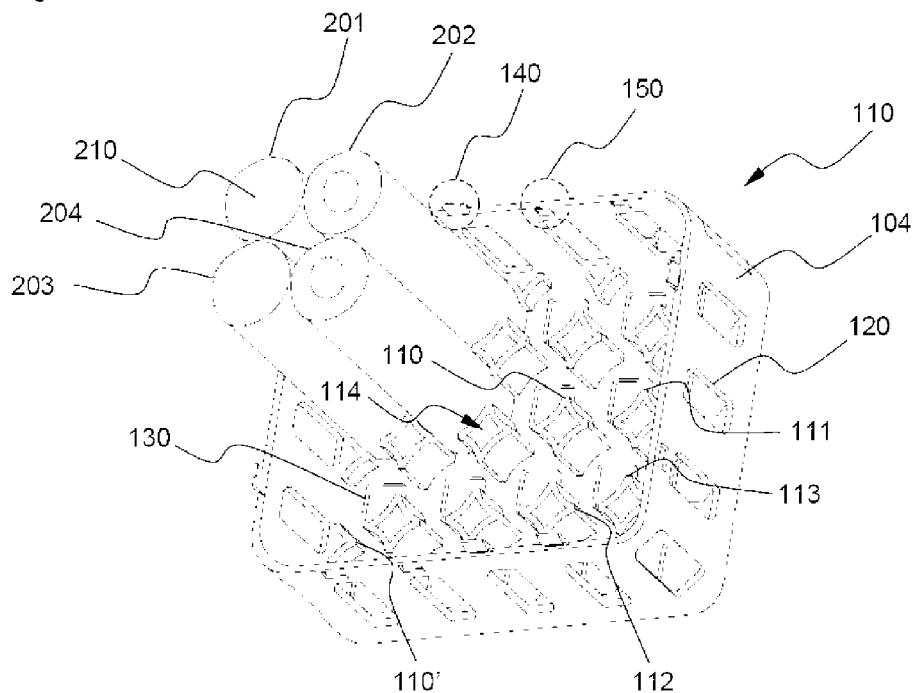
FIG. 2 is a perspective view illustrating the internal structure of the pack case (an upper case or a lower case) constituting the battery pack shown in FIG. 1.
Figure 3:
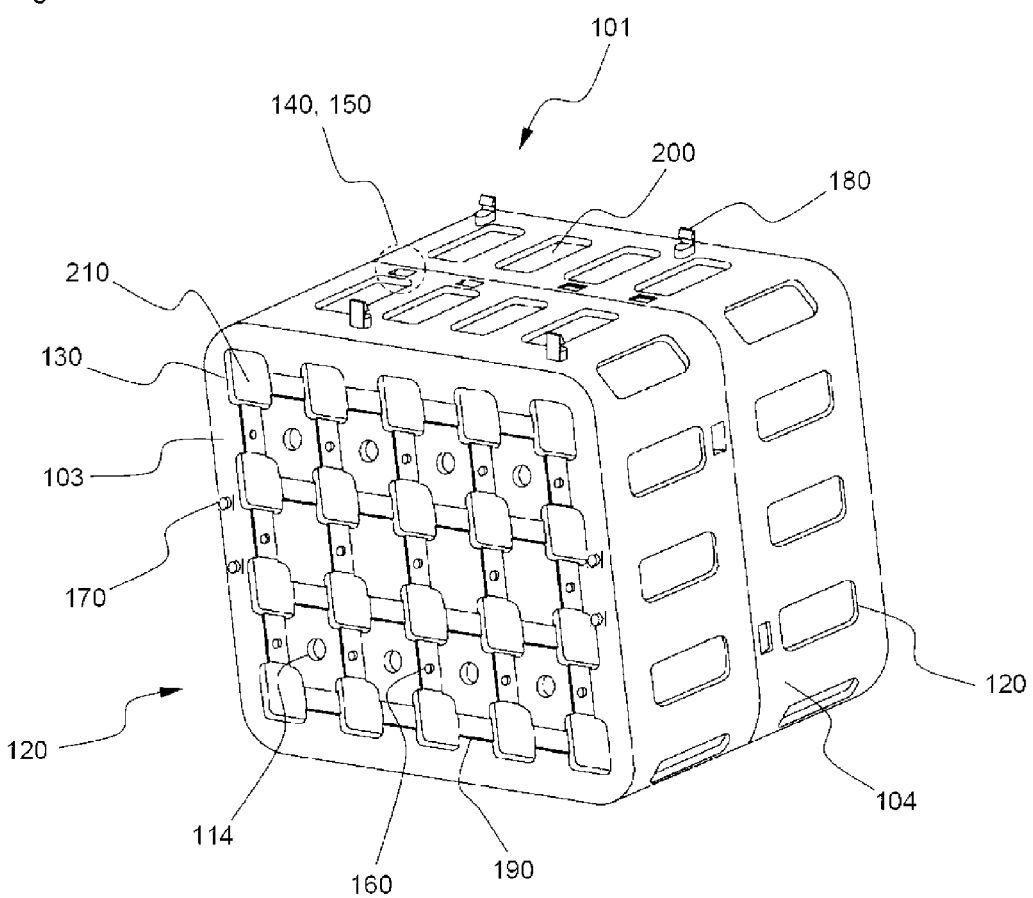
FIG. 3 is a perspective view illustrating a process for mounting a plurality of battery cells in the pack case by coupling the upper case and the lower case with each other during the assembly of the battery pack shown in FIG. 1.

Referring to FIGS. 1 to 3, the pack case 100 is constructed generally in a hollow hexahedral structure. The pack case 100 is provided at the bottom 103 thereof with spacers 110 for maintaining the arrangement structure of the battery cells 200 and connection through-holes 130 through which electrode terminals 210 of the battery cells are exposed to the outside of the pack case 100. Also, the pack case 100 is provided at the side 104 thereof with ventilation openings 120 through which heat generated from the battery cells 200 is discharged to the outside of the pack case 100.

The spacers 110 extrude from the bottom 103 of the pack case 100. The spacers 110 are arranged such that neighboring four spacers 110, 111, 112, and 113 form a hollow cylindrical structure. Consequently, each spacer 110 partially surrounds the outer circumferences of neighboring four cylindrical battery cells 200, 201, 202, and 203.

Spacers 110' located at the outermost regions of the pack case 100 along the side 104 of the pack case 100 partially surround the outer circumferences of neighboring two battery cells 201 and 203 that are located at the outermost regions of the pack case 100. Specifically, the outermost spacers 110' are constructed in a form corresponding to a half of the middle spacers 110. In the center of each spacer 110 is formed a through-hole 114 which communicate with the outside of the pack case 100 through the bottom 103 of the pack case 100. The through-holes 114 of the spacers 110 serve to discharge heat from the battery cells 200 to the outside of the pack case 100 together with the ventilation openings 120.

The connection through-holes 120 are arranged in a structure in which each connection through-hole 120 is located among neighboring four spacers 110, 111, 112, and 113 such that the electrode terminals 210 of the battery cells 200 are exposed to the outside of the pack case 100 through the bottom 103 of the pack case 100.

Each ventilation opening 120 is located at a position corresponding to the interface between neighboring two battery cells 201 and 202. Consequently, heat generated from the battery cells 200 is effectively discharged along the interfaces between the respective battery cells 200.

At the upper end of the side 104 of the pack case 100 are formed first hooks 140 and first coupling grooves 150. The first hooks 140 and the first coupling grooves 150 are arranged such that the first hooks 140 and the first coupling grooves 150 correspond to each other at the upper ends of the respective sides 104 of the upper case 101 and the lower case 102, as shown in FIG. 3. Consequently, the two cases 101 and 102 are coupled with each other through the insertions of the first hooks 140 into the corresponding first coupling grooves 150. Also, second hooks 180 are formed at the lower end of the side 104 of the pack case 100 such that the protection circuit unit 500 is mounted to the pack case 100 by means of the second hooks 180.

The pack case 100 is provided at the bottom 103 thereof with a plurality of protrusions 160, by means of which the metal plate 300 for electrically connecting the battery cells 200 with each other is mounted to the pack case 100, and another plurality of protrusions 170, by means of which the FPCB 400 connected to the metal plate 300 for detecting the voltage of the battery cells 200 is mounted to the pack case 100.

The metal plate mounting protrusions 160 are formed among the connection through-holes 130 along rows of the battery cells 200. The FPCB mounting protrusions 170 are formed at the middle regions of the opposite sides of the bottom 103 of the pack case 100.

Also, the pack case 100 is provided at the bottom 103 thereof with grooves 190 formed to interconnect the connection through-holes 130 such that the metal plate 300 is connected to the electrode terminals 210 of the battery cells in position.

Figure 4:
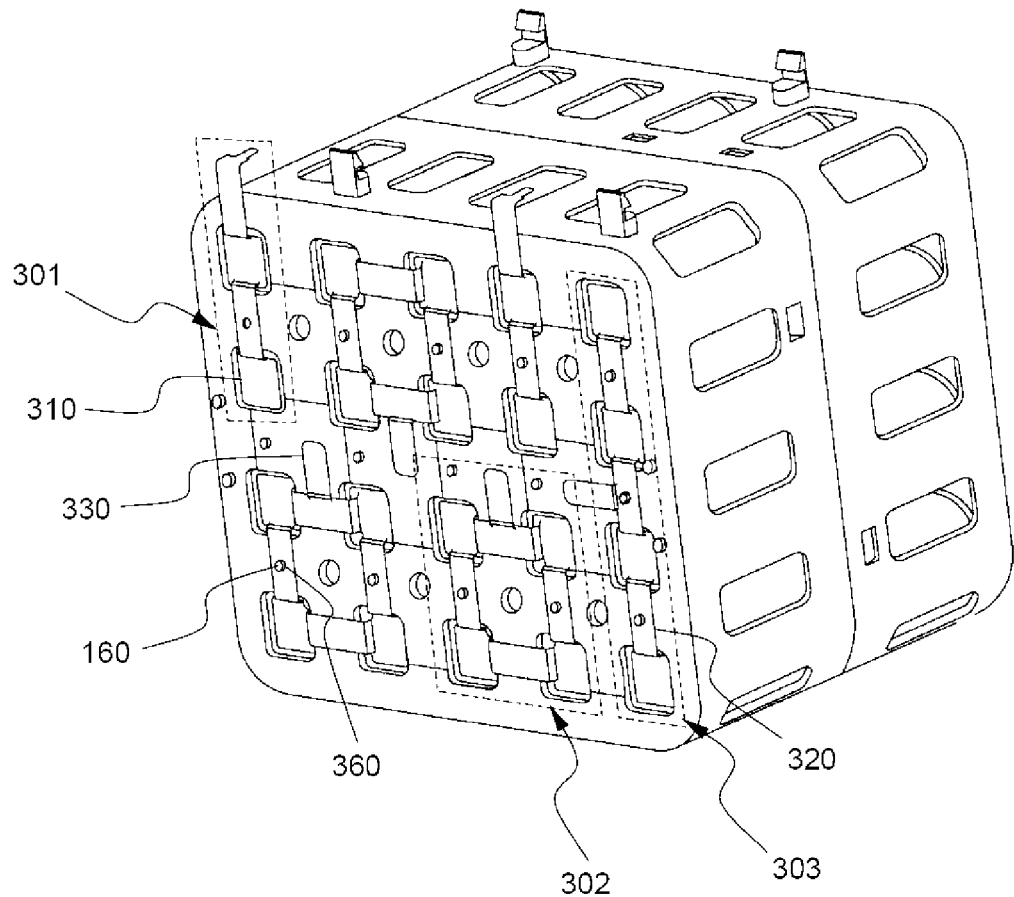
FIG. 4 is a perspective view illustrating a process for mounting a connection member to the outer surface of the pack case shown in FIG. 3 during the assembly of the battery pack shown in FIG. 1.

FIG. 4 is a perspective view typically illustrating a metal plate, as the connection member, mounted to the battery pack shown in FIG. 1, and FIGS. 5 to 7 are enlarged views typically illustrating exemplary structures of the metal plate shown in FIG. 4.

Referring to these drawings together with FIG. 1, the metal plate 300 is mounted to the bottom 103 of the pack case 100 by means of the protrusions 160 so as to electrically connect the electrode terminals 210 exposed to the outside as shown in FIG. 3.

The metal plate 300 includes terminal contact parts 310 contacting the electrode terminals 210 of the battery cells 200, the connection parts 320 for connecting the terminal contact parts 310 with each other, and external input and output terminal parts 330 and 350 protruding from the terminal contact parts 310 or the connection parts 320. Each connection part 320 is provided with grooves 360, which correspond to the metal plate mounting protrusions 160 formed at the bottom 103 of the pack case 100. The terminal contact parts 310 of the metal plate 300 is lowered by the thickness of the bottom 103 of the pack case 100 than the connection parts 320 of the metal plate 300 such that the metal plate 300 is stably mounted to the bottom 103 of the pack case 100.

The metal plate 300 is divided into A-type metal plates 301, B-type metal plates 302, and a C-type metal plate 303 based on the structure of the terminal contact parts 310 and the connection parts 320 of the metal plate 300.

Figure 5:
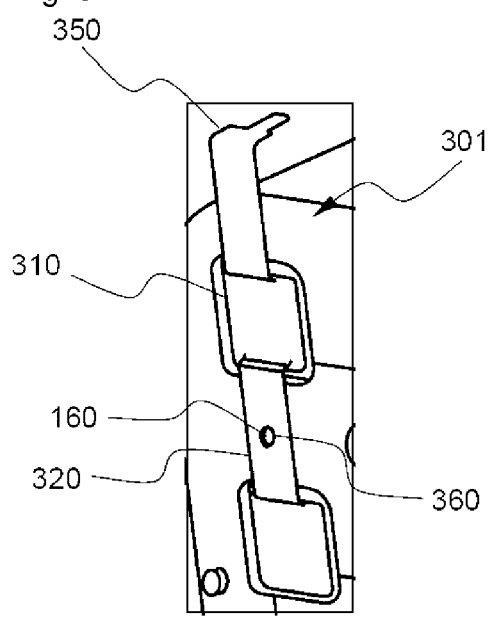
FIGS. 5 to 7 are enlarged views illustrating connection members according to preferred embodiments of the present invention.

As shown in FIG. 5, each A-type metal plate 301 is constructed in a structure to electrically connect two battery cells arranged in a line. Specifically, each A-type metal plate 301 includes two terminal contact parts 310 and a connection part 320 for interconnecting the two terminal contact parts 310.

Figure 6:
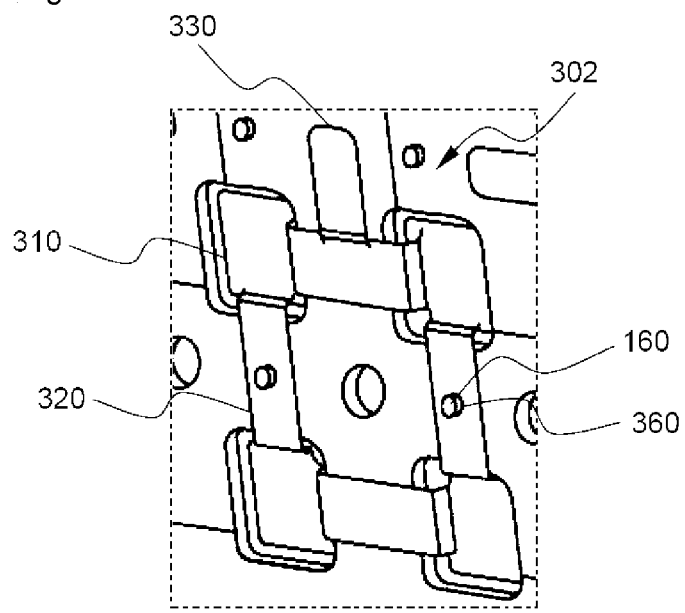

As shown in FIG. 6, each B-type metal plate 302 is constructed to electrically connect four battery cells arranged in a rectangular shape. Specifically, each B-type metal plate 302 includes four terminal contact parts 310 and four connection parts 320 for interconnecting the four terminal contact parts 310.

Figure 7:
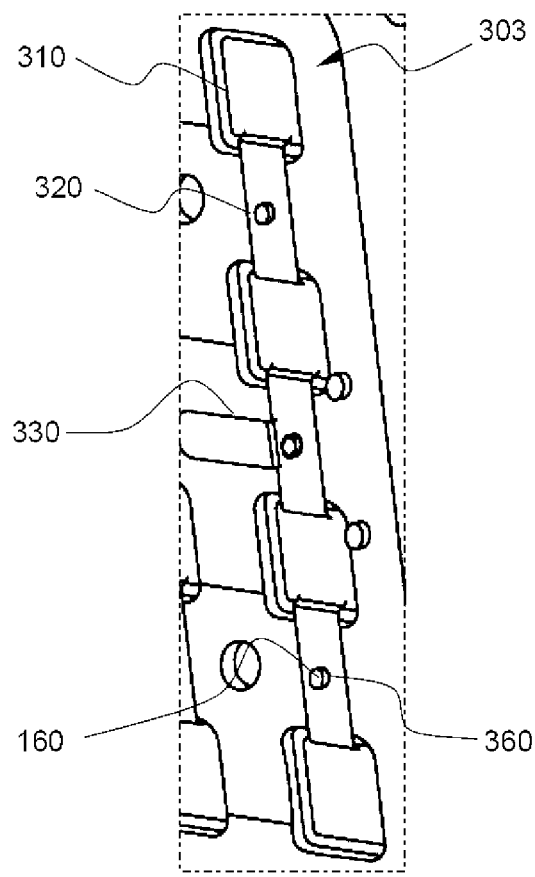

As shown in FIG. 7, the C-type metal plate 303 is constructed in a structure to electrically connect four battery cells arranged in a line. Specifically, the C-type metal plate 303 includes four terminal contact parts 310 and three connection parts 320 for for interconnecting the four terminal contact parts 310.

For each A-type metal plate 301, the external input and output terminal part 350 protrudes from the corresponding terminal contact part 310 toward the side 104 of the pack case 100 to which the protection circuit unit 500 is mounted such that the external input and output terminal part 350 is directly connected to the protection circuit unit 500. For each B-type metal plate 302 and the C-type metal plate 303, the external input and output terminal part 330 protrudes from the corresponding connection part 320 such that the external input and output terminal part 330 is connected to the FPCB 400. Especially, the external input and output terminal part 350 of each A-type metal plate 301 is bent at the end thereof such that the protection circuit unit 500 is mechanically fixed by the bent external input and output terminal part 350. The external input and output terminal parts 350 of the A-type metal plates 301 are the final electrode terminals of the battery cells 200 that serve as the external input and output terminals of the battery pack 600.

Figure 8:
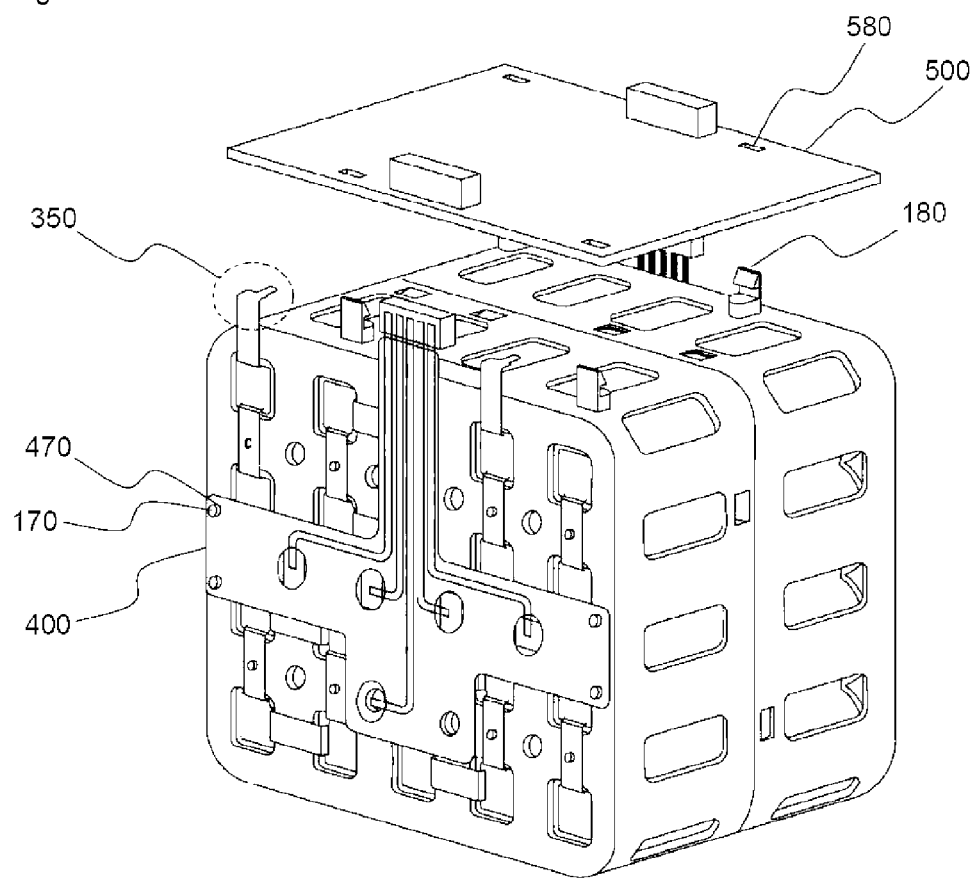
FIG. 8 is a perspective view illustrating a process for mounting a detection member to the connection members shown in FIGS. 5 to 7, such that the detection member is electrically connected to the connection members, and mounting a protection circuit module to the detection member, such that the protection circuit module is electrically connected to the detection member, during the assembly of the battery pack shown in FIG. 1.

FIG. 8 is a perspective view typically illustrating a FPCB, as the detection member, and a protection circuit unit mounted to the battery pack shown in FIG. 1.

Referring to FIGS. 1 and 8, the FPCB 400 is mounted to the bottom 103 of the pack case 100, by means of the FPCB mounting protrusions 170, such that the FPCB 400 is connected to the external input and output terminal parts 330 of the metal plate 300. The protection circuit unit 500 is mounted to the side 104 of the pack case 100, by means of the second hooks 180, such that the protection circuit unit 500 is electrically connected to the FPCB 400. To this end, the FPCB 400 is provided with grooves 470 corresponding to the FPCB mounting protrusions 170 formed at the bottom 103 of the pack case 100, and the protection circuit unit 500 is provided with coupling grooves 580 corresponding to the second hooks 180 formed at the side 104 of the pack case 100.

The protection circuit unit 500 is primarily coupled to the pack case 100 by means of the second hooks 180 of the pack case 100. However, as previously described in connection with FIG. 5, the coupling force between the protection circuit unit 500 and the pack case 100 may be further increased by the external input and output terminal parts 350 of the A-type metal plates 301.

Figure 9:
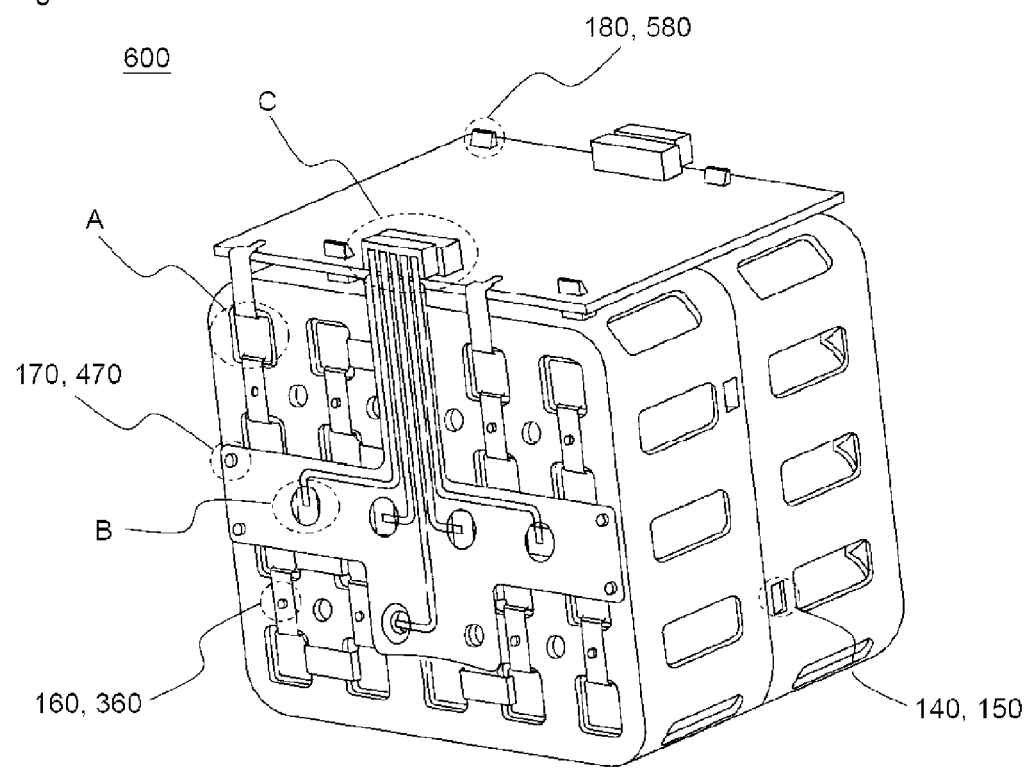
FIG. 9 is a perspective view illustrating a battery pack assembled in accordance with a preferred embodiment of the present invention.

FIG. 9 is a perspective view typically illustrating a battery pack manufactured in accordance with an exemplary structure and process.

Referring to FIGS. 1 and 9, the battery pack 600 is assembled by coupling the upper case 101 and the lower case 102 with each other, while a plurality of battery cells are mounted in a space defined between the upper case 101 and the lower case 102, through the insertion of the first hooks 140 into the corresponding coupling grooves 150, mounting the metal plate 300 to the pack case, while the metal plate 300 is connected to the battery cells 200 (see circle A), through the insertion of the metal plate mounting protrusions 160 into the corresponding grooves 360, mounting the FPCB 400 to the pack case, while the FPCB 400, as the detection member, is connected to the metal plate 300 (see circle B), through the insertion of the FPCB mounting protrusions 170 into the corresponding grooves 470, and mounting the protection circuit unit 500 to the pack case, while the protection circuit unit 500 is connected to the FPCB 400 (see circle C), through the insertion of the second hooks 180 into the corresponding coupling grooves 580.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As apparent from the above description, the pack case according to the present invention has effects in that a plurality of battery cells are stably mounted in the pack case in a compact structure through a simple assembly process, heat generated from the battery cells is effectively removed during the charge and discharge of the battery cells, and an additional safety unit, such as a detection member and/or a protection circuit module, is easily mounted to the pack case.

The invention claimed is:

1. A pack case for mounting a plurality of battery cells to electrically connect the plurality of battery cells with each other, comprising:

an upper case and a lower case constructed to form a hollow structure for mounting the battery cells therein;

a plurality of spacers integrally provided at an inner part of each of the upper case and the lower case for supporting the battery cells;

a plurality of ventilation openings disposed on at least one of the upper case and the lower case;

connection through-holes provided in an outer part of each of the upper case and the lower case corresponding to electrode terminals of the battery cells through which electrode terminals of the battery cells are exposed;

protrusions provided in each of the upper case and the lower case and disposed between connection through-holes; and a plurality of connection members for electrically connecting the electrodes of the battery cells, the plurality of connection members including grooves, each of the grooves coupled to one of each of the protrusions for mounting the plurality of connection members to each of the upper case and the lower case;

wherein the spacers protrude from the inner part of each of the upper case and the lower case such that each of the spacers partially surround the outer circumferences of four neighboring battery cells, and each of the upper case and the lower case is provided in the outer part thereof with exhaust through-holes at a center of each spacer, such that the spacers communicate with the outside of the pack case to discharge heat from the battery cells to the outside of the pack case.

2. The pack case according to claim 1, wherein the upper case and the lower case are constructed in a symmetrical hexahedral structure.

3. The pack case according to claim 1, wherein the upper case and the lower case are coupled with each other through the coupling between hooks and coupling grooves formed at one side of the interface between the upper case and the lower case.

4. The pack case according to claim 1, wherein each of the connection members is a metal plate.

5. The pack case according to claim 1, wherein the upper case and/or the lower case is provided with coupling members for mounting a protection circuit unit to the corresponding case.

6. The pack case according to claim 5, wherein the coupling members are constructed in a hook structure.

7. A battery pack including the pack case according to claim 1.

8. The battery pack according to claim 7, wherein the battery pack is configured and arranged for high rate discharge.

9. The battery pack according to claim 8, wherein the battery pack is configured and arranged as a power source for power tools.

10. The battery pack according to claim 8, wherein the battery pack is configured and arranged as a power source for hybrid electric vehicles.

11. The battery pack according to claim 7, wherein electrode terminals of battery cells constituting the battery pack are exposed through connection through-holes formed in the outer parts of the upper and lower cases at positions corresponding to the electrode terminals of battery cells in the pack case, and the wherein electrode terminals of battery cells are electrically connected with each other by each of the connection members mounted to the outer part of the corresponding case.

12. The battery pack according to claim 11, wherein a detection member for detecting the voltage of the battery cells is further connected to each of the connection members.

13. The battery pack according to claim 12, wherein the detection member is a printed circuit board (PCB) or a flexible printed circuit board (FPCB).

14. The battery pack according to claim 12, wherein a protection circuit unit is further mounted to one side of the pack case, and the detection member is connected to the protection circuit unit.

15. The pack case according to claim 1, wherein each of the plurality of battery cells is supported by multiple spacers.

16. The pack case according to claim 1, wherein each of the plurality of spacers supports at least two battery cells.

17. The pack case according to claim 1, wherein each of the plurality of spacers is disposed between two battery cells.

* * * * *